United States Patent
Poelsma et al.

(10) Patent No.: US 11,850,792 B2
(45) Date of Patent: Dec. 26, 2023

(54) METHOD FOR CALIBRATING AN APPARATUS FOR PRODUCING AN OBJECT BY MEANS OF ADDITIVE MANUFACTURING, AND APPARATUS FOR THE METHOD

(71) Applicant: Additive Industries B.V., Eindhoven (NL)

(72) Inventors: Sandra Susan Poelsma, Eindhoven (NL); Erwin Wijn, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 64 days.

(21) Appl. No.: 16/882,893

(22) Filed: May 26, 2020

(65) Prior Publication Data

US 2020/0376772 A1 Dec. 3, 2020

(30) Foreign Application Priority Data

May 27, 2019 (EP) .................................. 19176755.7

(51) Int. Cl.
*B29C 64/153* (2017.01)
*B29C 64/245* (2017.01)
(Continued)

(52) U.S. Cl.
CPC ............ *B29C 64/153* (2017.08); *B22F 10/28* (2021.01); *B22F 10/31* (2021.01); *B29C 64/236* (2017.08);
(Continued)

(58) Field of Classification Search
None
See application file for complete search history.

(56) References Cited

U.S. PATENT DOCUMENTS 5,184,307 A * 2/1993 Hull ....................... B33Y 50/00
264/401
2017/0203512 A1* 7/2017 Gold ....................... B22F 10/20
(Continued)

FOREIGN PATENT DOCUMENTS

| DE | 10 2013 208 651 A1 | 11/2014 |
| EP | 3 088 200 A1 | 11/2016 |
| WO | 2019/059761 A1 | 3/2019 |

OTHER PUBLICATIONS

Jigang et al., Two Dimensional Laser Galvanometer Scanning Technology for Additive Manufacturing, International Journal of Materials, Mechanics and Manufacturing, vol. 6, No. 5, Oct. 2018 (Year: 2018).*

*Primary Examiner* — S. Behrooz Ghorishi
(74) *Attorney, Agent, or Firm* — Suiter Swantz pc llo (57) ABSTRACT

A method for calibrating an apparatus for producing an object by additive manufacturing, the apparatus including a process chamber for receiving a bath of material to be solidified by exposure to electromagnetic radiation, a support for positioning the object in relation to the surface level of the bath of material, and a solidifying device for solidifying a selective layer-part of the material on the surface level by electromagnetic radiation, the method including controlling the solidifying device to make a first test mark at a first delay setting, controlling the solidifying device to make a second test mark at a second delay setting different from the first delay setting, and determining a delay setting based on at least the first test mark and the second test mark.

15 Claims, 7 Drawing Sheets

(51) Int. Cl.
    *B29C 64/393*    (2017.01)
    *B29C 64/236*    (2017.01)
    *B29C 64/268*    (2017.01)
    *B29C 64/25*     (2017.01)
    *B22F 10/28*     (2021.01)
    *B22F 10/31*     (2021.01)
    *B33Y 10/00*     (2015.01)
    *B33Y 30/00*     (2015.01)
    *B33Y 50/02*     (2015.01)
    *B22F 12/44*     (2021.01)
    *B22F 12/90*     (2021.01)

(52) U.S. Cl.
    CPC ............ *B29C 64/245* (2017.08); *B29C 64/25* (2017.08); *B29C 64/268* (2017.08); *B29C 64/393* (2017.08); *B22F 12/44* (2021.01); *B22F 12/90* (2021.01); *B33Y 10/00* (2014.12); *B33Y 30/00* (2014.12); *B33Y 50/02* (2014.12)

(56) References Cited

U.S. PATENT DOCUMENTS

2018/0370146 A1* 12/2018 Domröse ............... B29C 64/277
2021/0387259 A1* 12/2021 Barnes ................... B22F 12/45

\* cited by examiner

METHOD FOR CALIBRATING AN APPARATUS FOR PRODUCING AN OBJECT BY MEANS OF ADDITIVE MANUFACTURING, AND APPARATUS FOR THE METHOD

TECHNICAL FIELD AND BACKGROUND

The invention relates, according to a first aspect, to a method for calibrating an apparatus for producing an object by means of additive manufacturing. According to a second aspect, the present invention relates to an apparatus for producing an object by means of additive manufacturing. According to a third aspect, the present invention relates to a method for manufacturing an object by means of additive manufacturing using an apparatus according to the second aspect, wherein the apparatus is calibrated using the method according to the first aspect of the present invention.

Three-dimensional (3D) printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing will become increasingly more important in the future, as the increasing competitive pressures force companies to not only manufacture more economically with a constant high product quality, but also to save time and costs in the area of product development. The life span of products is continuously shortened. In addition to product quality and product costs, the moment of market introduction is becoming increasingly important for the success of a product.

The 3D object may be produced by selectively solidifying, in a layer-like fashion, a powder, paper or sheet material to produce a 3D object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry and are produced from a 3D model or other electronic data source.

In order to print a 3D object, a printable model is created with a computer design package or via a 3D scanner, for example. Usually, the input is a 3D CAD file such as an STL file, a STEP file or an IGS file. Before printing the object from a CAD file, the file is processed by a software application which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to build the 3D object from a series of cross sections. These layers, which correspond to the virtual cross sections from the CAD model, are during this process joined or fused at the same time to create the final 3D object.

One of the challenges in the manufacturing of 3D objects, in particular in the additive manufacturing of metal objects, is how to accurately solidify selective parts of the layer. Production systems that use high power laser positioning systems suffer from synchronization errors due to timing errors, ramp up/ramp down behavior of laser systems, and dynamic behavior of scanners, which cause accuracy errors in the products.

Delay settings are available to match laser power emission and actual laser position. These delay settings are capable of controlling for instance a laser on/off delay, a jump delay and a mark delay. Optimization of delay settings is labor intensive work and requires a skilled operator.

It is therefore an object to provide a method and apparatus with which the accuracy and speed of calibration of the apparatus for producing an object by means of additive manufacturing may be improved.

BRIEF SUMMARY

To this end, the invention provides a method for calibrating an apparatus for producing an object by means of additive manufacturing. In the method, the apparatus includes a process chamber for receiving a bath of material which can be solidified by exposure to electromagnetic radiation, a support for positioning the object in relation to the surface level of the bath of material, and a solidifying device for solidifying a selective layer-part of the material on the surface level by means of electromagnetic radiation.

A method according to the invention includes the steps of controlling the solidifying device for making a first test mark at a first delay setting, controlling the solidifying device for making a second test mark at a second delay setting different from the first delay setting, and determining a delay setting, preferably an optimal delay setting, based on at least the first test mark and the second test mark.

In an embodiment of the method, wherein the apparatus includes a deflector unit for deflecting the electromagnetic radiation along the surface level, the method includes the steps of controlling the solidifying device and the deflector unit for making a first test mark at a first delay setting, and controlling the solidifying device and the deflector unit for making a second test mark at a second delay setting different from the first delay setting.

A delay setting according to the invention may relate to a solidifying device on/off delay setting such as a laser on/off delay setting. The delay setting may furthermore relate to a jump delay setting and a mark delay setting.

Within the context of the present disclosure, a solidifying device on delay setting is to be understood as a setting, such as a software setting, arranged for delaying a solidifying device on command to the solidifying device. By delaying the solidifying device on command, receipt of the solidifying device on command, by the solidifying device is delayed. As a result of this delayed receipt, by the solidifying device, the solidifying device will start emitting the electromagnetic radiation after a time delay corresponding to the delay setting. Such a time delay is for instance attractive for avoiding, or at least significantly reducing the risk of, a relative high energy density of the electromagnetic radiation at the surface level after the start of emitting the electromagnetic radiation. The relative high energy density may for instance be due to acceleration of movement of the electromagnetic radiation along the surface level by a deflector unit for deflecting the beam of electromagnetic radiation along the surface level. Preferably, the solidifying device on delay setting corresponds to a time required by the deflector unit for reaching a condition, for instance after an idle condition of the deflector unit and/or receipt of a command for initiating movement of the electromagnetic radiation along the surface level, by the deflector unit, wherein the deflecting of the electromagnetic radiation along the surface level occurs at relative constant speed. Alternatively, a solidifying device on delay setting corresponding to a time delay that is relatively long may cause, during manufacturing of an object, the process of solidifying the selective layer-part of the material on the surface level by means of electromagnetic radiation to start too late, thereby partly preventing solidification of the selective layer-part.

Within the context of the present disclosure, a solidifying device off delay setting is to be understood as a setting, such as a software setting, arranged for delaying a solidifying device off command to the solidifying device. By delaying the solidifying device off command, receipt of the solidifying device off command, by the solidifying device is delayed. As a result of this delayed receipt, by the solidifying device, the solidifying device will maintain emitting the electromagnetic radiation during a time period corresponding to the solidifying device off delay setting. Such a time period is for instance attractive for avoiding, or at least significantly reducing the risk of, stopping the process of solidifying the selective layer-part of the material on the surface level by means of electromagnetic radiation too early, i.e. before the selective layer-part is completely solidified. A solidifying device off delay setting corresponding to a time delay that is relatively long may cause a relative high energy density of the electromagnetic radiation at the surface level near the end of solidifying the selective layer-part. The relative high energy density may for instance be due to slowing down of the movement of the electromagnetic radiation along the surface level by the deflector unit.

Preferably, the solidifying off delay setting corresponds to a time required by the deflector unit for completing a predetermined movement of the electromagnetic radiation along the surface level of the selective layer-part by the deflector unit.

Within the context of the present disclosure, a jump delay setting is to be understood as a setting, such as a software setting, arranged for delaying the solidifying device on command to the solidifying device for delaying start of emission of electromagnetic radiation, emitted by the solidifying device, wherein the jump delay setting indicates a time for actuating the deflector unit for deflecting the electromagnetic radiation along the surface level to a predetermined position, preferably to a predetermined start position. In other words the jump delay setting allows the deflection device to achieve a condition wherein the electromagnetic radiation is deflected along the surface level to a predetermined position, preferably a predetermined start position, before providing the solidifying device on command to the solidifying device or before delaying the solidifying device on command by the solidifying device on delay setting before providing the solidifying device on command to the solidifying device. By delaying the solidifying device on command by the jump delay setting, receipt of the solidifying device on command, by the solidifying device is delayed by a time that corresponds to a time for actuating the deflector unit for deflecting the electromagnetic radiation along the surface level to a predetermined position, preferably to a predetermined start position. As a result of this delayed receipt, by the solidifying device, the solidifying device will start emitting the electromagnetic radiation after a time delay corresponding to the jump delay setting or corresponding to an aggregate time period of the jump delay setting and the solidifying device on delay setting. Such a time delay is for instance attractive for avoiding, or at least significantly reducing the risk of, starting the process of solidifying the selective layer-part of the material on the surface level by means of electromagnetic radiation too early or too late.

Preferably, the solidifying device on delay starts upon the end of the jump delay. In other words, the time delay corresponding to the solidifying device on delay setting for providing the solidifying on command to the solidifying device start upon completion of the delay period defined by the jump delay setting.

Within the context of the present disclosure, a mark delay setting is to be understood as a setting, such as a software setting, arranged for delaying a stop of movement command to the deflector unit for deflecting the electromagnetic radiation, emitted by the solidifying device, along the surface level. In other words the mark delay setting allows the deflection device to achieve a condition wherein the electromagnetic radiation is deflected along the surface level to a predetermined position, preferably a predetermined end position.

By delaying the stop of movement command, receipt of the stop of movement command, by the deflector unit is delayed by a time that corresponds to a time for actuating the deflector unit for deflecting the electromagnetic radiation along the surface level to a predetermined position, preferably to a predetermined end position. As a result of this delayed receipt, by the deflector unit, the deflector unit will maintain moving after a time delay corresponding to the mark delay setting. Such a time delay is for instance attractive for avoiding, or at least significantly reducing the risk of, stopping the process of solidifying the selective layer-part of the material on the surface level by means of electromagnetic radiation too early or too late.

According to the invention, a first test mark is provided on or near the support. The first test mark is provided at a first delay setting. Then, a second test mark is provided on or near the support. The second test mark is provided at a second delay setting that differs from the first delay setting. This allows the influence of a different delay setting for the solidifying device and/or the deflector unit to be examined. Once the test marks are made, the marks are examined and a delay setting, preferably an optimal delay setting, is determined. The delay setting, preferably optimal delay setting, may be one of the delay settings actually used, for example one of the first and second delay settings. Alternatively, an intermediate setting may be used as well, for example a setting that is based on the first and second delay setting. For example, a fit may be used to determine an optimum delay setting.

In this regard, it is beneficial if during the steps of controlling, the first delay setting and the second delay setting are both one of the solidifying device on delay setting, the solidifying device off delay setting, the jump delay setting or the mark delay setting.

The method according to the invention may be repeated for different location settings on or near the support. The support, i.e. the level of the bath of material, defines a working plane for the solidifying device (xy-plane). For different locations in this plane, the calibration method according to the invention may be repeated. Thus, for a first coordinate at least a first and second test mark are made and a delay setting, preferably an optimal delay setting, is determined. Then, for a second coordinate at least a first and second test mark are made and a delay setting, preferably an optimal delay setting, is determined. This may be done for any given number of grid points in the working plane, for example for a regular rectangular grid. A function may be fitted to the obtained delay settings, preferably the optimal delay settings, for the grid, allowing a smooth function of delay settings to be used for the working plane. The above allows different calibrated delay settings to be used for different locations, and with this the accuracy of the device and of the calibration is increased. Therefore, the object of the invention is achieved.

Further advantageous embodiments will be described below.

In an embodiment, the method includes the step of controlling the solidifying device for making a reference mark. The step of determining a delay setting, preferably an optimal delay setting, includes the step of determining a delay setting, preferably an optimal delay setting, based on the reference mark. The reference mark may for example be used as an intended start or stop mark. The test mark may be compared to the reference mark, and it can be determined whether the test mark indeed started (or stopped) at the reference mark, for example. Thus, the reference mark and the corresponding test mark may provide information on the accuracy of the delay setting used.

In an embodiment, the reference mark is a line, and the first and second test marks are lines having an orthogonal component with respect to the reference mark. In particular, the first and second test marks may be made substantially orthogonal with respect to the reference mark. It is possible that the step of determining a delay setting, preferably an optimal delay setting, includes the step of determining a distance between the reference mark and the respective first and second test marks.

In a further embodiment, the method may comprise the step of controlling the solidifying device for making a further reference mark. The further reference mark may be made at a distance from the reference mark. The further reference mark may be a line, in particular a line that is provided substantially parallel to the reference mark. The first and second test marks may be made with the intention to exactly start at the reference mark, and to exactly end at the further reference mark, or vice versa. A laser on/off delay setting may be independently calibrated this way. Any setting that starts at the reference line and ends at the further reference line (or vice versa) will be considered to be a delay setting, preferably an optimal delay setting, for the solidifying device and/or the deflector unit and for the given location.

In an embodiment, the method includes the step of providing a calibration system with a sensor unit that can be directed to the support, and the method includes the further steps of determining, with the sensor unit, a measure for the position of the first and second test marks, and determining, with the calibration system, the delay setting, preferably the optimal delay setting.

By using a calibration system, any apparatus may be calibrated using the method according to the invention. In particular, a more objective and reproducible calibration is possible, independent from the apparatus used, and independent from the user that calibrates the apparatus. Additionally, a calibration system increases the speed with which the calibration may be performed.

The sensor unit may, in an embodiment, include an imaging device, wherein the imaging device is used for obtaining an image of the test marks. The imaging device may also be used for obtaining an image of the reference mark (and further reference mark, when applicable). The calibration system may be arranged for determining a distance between the reference mark and either one of the test marks. In case a further reference mark is used, the calibration system may be arranged for determining a distance between the further reference mark and either one of the test marks. The calibration unit may for example be arranged for detecting the marks based on a contrast detection of the image obtained by the imaging device.

The imaging device is in an embodiment arranged in such a way that an optical path of the imaging device, in use of the apparatus, coincides at least partly with an optical path of the electromagnetic radiation of the solidifying device. This way, the imaging device is substantially aligned with the solidifying device, giving direct feedback on inaccuracies. Therefore, easy and precise imaging of the test marks and/or reference marks may be done, leading to very accurate delay corrections.

In an embodiment of the method according to the invention during the steps of controlling a beam of the electromagnetic radiation, emitted by the solidifying device, is moved in a first direction. Preferably, the method further includes the steps of repeating the steps of controlling and determining, wherein during the repeated steps of controlling the solidifying device, the beam of the electromagnetic radiation, emitted by the solidifying device, is moved in a second direction, wherein the second direction differs from the first direction for determining the delay setting, preferably optimal delay setting, in the first direction and in the second direction. A determined delay setting, preferably optimal delay setting, in two different directions is beneficial for improving the accuracy of the apparatus. In particular when the apparatus includes a deflector unit comprising two moveable mirrors for deflecting the beam of electromagnetic radiation in a working plane it is beneficial to determine delay setting, preferably optimal delay setting, in two different directions, wherein the two different directions correspond to the respective direction of deflection, by the moveable mirrors, of the beam of electromagnetic radiation for improving the accuracy and speed of calibration of the apparatus for producing an object by means of additive manufacturing.

In an embodiment of the method according to the invention, the distance includes a first distance component and a second distance component, wherein the second distance component, in a working plane, encloses an angle with the first distance component, wherein a delay setting, preferably an optimal delay setting, in a first direction is based on the first distance component and a delay setting, preferably an optimal delay setting, in a second direction is based on the second distance component. A determined delay setting, preferably optimal delay setting, in two different directions is beneficial for improving the accuracy of the apparatus. In particular when the apparatus includes a deflector unit comprising two moveable mirrors for deflecting the beam of electromagnetic radiation in a working plane it is beneficial to determine delay settings, preferably optimal delay settings, in two different directions, wherein the two different directions correspond to the respective direction of deflection, by the moveable mirrors, of the beam of electromagnetic radiation for improving the accuracy and speed of calibration of the apparatus for producing an object by means of additive manufacturing.

In an embodiment of the method according to the invention, during the steps of controlling a beam of the electromagnetic radiation, emitted by the solidifying device, is moved at a first speed, the method further comprising the steps of repeating the steps of controlling and determining, wherein during the repeated steps of controlling the solidifying device, the beam of the electromagnetic radiation, emitted by the solidifying device, is moved at a second speed, wherein during the step of determining the delay setting, preferably the optimal delay setting, is determined for the first and second speeds. It is observed that the delay setting, preferably the optimal delay setting, may depend on the movement speed of the beam of electromagnetic radiation. Determining the delay setting, preferably optimal delay setting, for different speeds is beneficial for improving the accuracy and speed of calibration of the apparatus for producing an object by means of additive manufacturing. Preferably, during the steps of controlling and determining, the beam of the electromagnetic radiation is moved at a speed of 0.5, 1.5 and 4 m/s when making the test marks.

It is advantageous if the delay setting is at least one of a solidifying device on delay setting arranged for delaying a solidifying device on command to the solidifying device for delaying start of emission of electromagnetic radiation, emitted by the solidifying device, a solidifying device off delay setting arranged for delaying a solidifying device off command to the solidifying device for delaying stop of emission of electromagnetic radiation, emitted by the solidifying device, a jump delay setting arranged for delaying the solidifying device on command to the solidifying device for delaying start of emission of electromagnetic radiation, emitted by the solidifying device, wherein the jump delay setting indicates a time for actuating a deflector unit for deflecting the electromagnetic radiation along the surface level to a predetermined position, preferably to a predetermined start position, and a mark delay setting arranged for delaying a stop of movement command to a deflector unit for deflecting the electromagnetic radiation, emitted by the solidifying device, along the surface level.

In this regard, it is beneficial if during the steps of controlling, the first delay setting and the second delay setting are both one of the solidifying device on delay setting, the solidifying device off delay setting, the jump delay setting or the mark delay setting, the method further including the steps of further controlling the solidifying device for making a further first test mark at a further first delay setting, further controlling the solidifying device for making a further second test mark at a further second delay setting different from the further first delay setting, and further determining a further delay setting, preferably a further optimal delay setting, based on at least the further first test mark and the further second test mark, wherein during the steps of further controlling the further first delay setting and the further second delay setting are both another one of the solidifying device on delay setting, the solidifying device off delay setting, the jump delay setting or the mark delay setting.

The steps of further controlling and further determining are beneficial for allowing setting of multiple delay settings in a practical manner.

Preferably, the method further includes the step of setting the delay setting, determined during the step of determining, to the delay setting, preferably the optimal delay setting, wherein the step of setting is performed before performing the steps of further controlling and further determining.

The present disclosure relies at least partly on the insight that the solidifying device on/off delay setting, the jump delay setting and the mark delay setting may mutually influence each other. In other words, the determined delay setting, determined during the step of determining, of one of the solidifying device on delay setting, the solidifying device off delay setting, the jump delay setting or the mark delay setting may influence the other of the solidifying device on delay setting, the solidifying device off delay setting, the jump delay setting or the mark delay setting set during the steps of further controlling. By setting, at least the delay setting, determined during the step of determining, to the delay setting, preferably the optimal delay setting, before performing the steps of further controlling, a set of delay settings may be obtained that may beneficially be used in combination during manufacturing of the object using the apparatus.

In an embodiment of the method, wherein the apparatus includes a deflector unit for deflecting the electromagnetic radiation along the surface level, the method includes the steps of further controlling the solidifying device and the deflector unit for making the further first test mark at the further first delay setting, and further controlling the solidifying device and the deflector unit for making the further second test mark at the further second delay setting different from the further first delay setting.

The method according to the invention may in particular be used to determine delay settings, preferably optimal delay settings, in an apparatus that includes a multitude of solidifying devices. According to an embodiment, the apparatus for producing an object by means of additive manufacturing includes a further solidifying device, and the method according to the invention includes the further steps of controlling the further solidifying device for making a third test mark at a third delay setting, controlling the further solidifying device for making a fourth test mark at a fourth delay setting different from the third delay setting, and determining a delay setting, preferably an optimal delay setting, based on at least the third test mark and the fourth test mark.

The third delay setting may of course correspond to the first delay setting, such that the same delay setting may be compared for different solidifying devices. Likewise, the fourth delay setting may correspond to the second delay setting. This way it is possible to optimize delay settings an apparatus with a plurality of solidifying devices. This is advantageous, as it allows the different solidifying devices to work more cooperatively, for example for solidifying overlapping or adjacent parts of the object to be produced more accurately with a plurality of solidifying devices at the same time.

The sensor unit may comprise at least a further imaging device that is arranged such that an optical path of the further imaging device, in use of the apparatus, coincides at least partly with an optical path of the electromagnetic radiation of the further solidifying device, wherein the further imaging device is used for obtaining an image of the third and fourth test marks. This improves the speed of calibration, as it allows for calibration of multiple solidifying devices at the same time. Additionally, by using multiple imaging devices it is possible to increase the accuracy of calibration, as spatial resolution of each imaging device may be increased without affecting the general calibration possibilities. Thus, by providing an imaging device for each of the solidifying devices, speed of the calibration and accuracy of the calibration may be increased.

In an embodiment, the further imaging device is arranged in such a way that an optical path of the imaging device, in use of the apparatus, coincides at least partly with an optical path of the electromagnetic radiation of the further solidifying device. As described before, the further imaging device is substantially aligned with the further solidifying device this way, giving direct feedback on inaccuracies.

In an embodiment of the method according to the invention, the method further includes the steps of controlling the solidifying device for making a fifth test mark at the delay setting, preferably the optimal delay setting, of the solidifying device, controlling the further solidifying device for making a sixth test mark at the delay setting, preferably the optimal delay setting, of the further solidifying device, and determining a difference in spatial accuracy between the solidifying device and the further solidifying device based on at least the fifth test mark and the sixth test mark.

Determining a difference in spatial accuracy is beneficial for improving the accuracy and speed of calibration of the apparatus for producing an object by means of additive manufacturing when deploying a multitude of solidifying devices.

In an embodiment of the method according to the present disclosure, the step of determining further includes determining, the delay setting, preferably the optimal delay setting, based on a width of the first test mark and/or the second test mark and/or a width variation of the first test mark and/or the second test mark along the first test mark and the second test mark.

A width of the first test mark or the second test mark, in particular a width variation of the first test mark or the second test mark may provide a measure corresponding to a delay setting. In particular, a width variation may indicate that the delay setting is not acceptable and/or not optimal. An increase of the width of the test mark near the end of the test mark may provide an indication that the solidifying device off delay setting corresponds to a time delay that is relatively long thereby causing a relative high energy density of the electromagnetic radiation at the surface level near the end of solidifying the selective layer-part. The relative high energy density may for instance be due to slowing down of the movement of the electromagnetic radiation along the surface level by the deflector unit.

An increase of the width of the test mark near the begin of the test mark may provide an indication that the solidifying device on delay setting corresponds to a time delay that is relatively short thereby causing a relative high energy density of the electromagnetic radiation at the surface level after the start of emitting the electromagnetic radiation. The relative high energy density may for instance be due to acceleration of movement of the electromagnetic radiation along the surface level by a deflector unit for deflecting the beam of electromagnetic radiation.

According to a second aspect, an apparatus for producing an object by means of additive manufacturing is provided, and includes a process chamber for receiving a bath of material which can be solidified by exposure to electromagnetic radiation, a support for positioning the object in relation to the surface level of the bath of material, a solidifying device for solidifying a selective layer-part of the material on the surface level by means of electromagnetic radiation, and a calibration system having a sensor unit that may be directed to the support.

According to the invention, the calibration system is adapted and arranged for controlling the solidifying device for making a first test mark at a first delay setting, controlling the solidifying device for making a second test mark at a second delay setting different from the first delay setting, and determining a delay setting, preferably an optimal delay setting, based on at least the first test mark and the second test mark.

The apparatus with calibration system allows for an effective and reproducible calibration of the apparatus. Additionally, since the apparatus includes the calibration system, calibration may be executed at any time. For instance, calibration may be performed at regular time intervals. This increases the accuracy of the apparatus. Further advantages of the apparatus have already been indicated with respect to the method.

Embodiments of the apparatus according to the second aspect correspond to embodiments of the method according to the first aspect of the present disclosure. The advantages of the apparatus according to the second aspect correspond to advantages of the method according to first aspect of the present disclosure presented previously.

In an embodiment, the sensor unit includes an imaging device that is arranged for obtaining an image of the first and second test marks. As indicated before, the imaging device may be arranged in such a way that an optical path of the imaging device, in use of the apparatus, coincides at least partly with an optical path of the electromagnetic radiation of the solidifying device. This improves the accuracy of the apparatus.

The apparatus may, in an embodiment, include a further solidifying device. The calibration system is then adapted and arranged for controlling the further solidifying device for making a third test mark at a third delay setting, controlling the further solidifying device for making a fourth test mark at a fourth delay setting different from the third delay setting, and determining a delay setting, preferably an optimal delay setting. for the further solidifying device based on at least the third test mark and the fourth test mark.

The sensor unit includes, in an embodiment, at least one further imaging device that is arranged in such a way that an optical path of the further imaging device, in use of the apparatus, coincides at least partly with an optical path of the electromagnetic radiation of the further solidifying device. This increases the accuracy of calibration.

According to a further aspect of the present disclosure, the invention relates to a method of manufacturing an object by means of additive manufacturing using an apparatus according to the second aspect of the present disclosure, wherein the apparatus is calibrated using the method according to the first aspect of the present disclosure.

BRIEF DESCRIPTION OF THE DRAWINGS

The invention will next be explained by way of the accompanying figures. In the figures.

DETAILED DESCRIPTION

Figure 1:
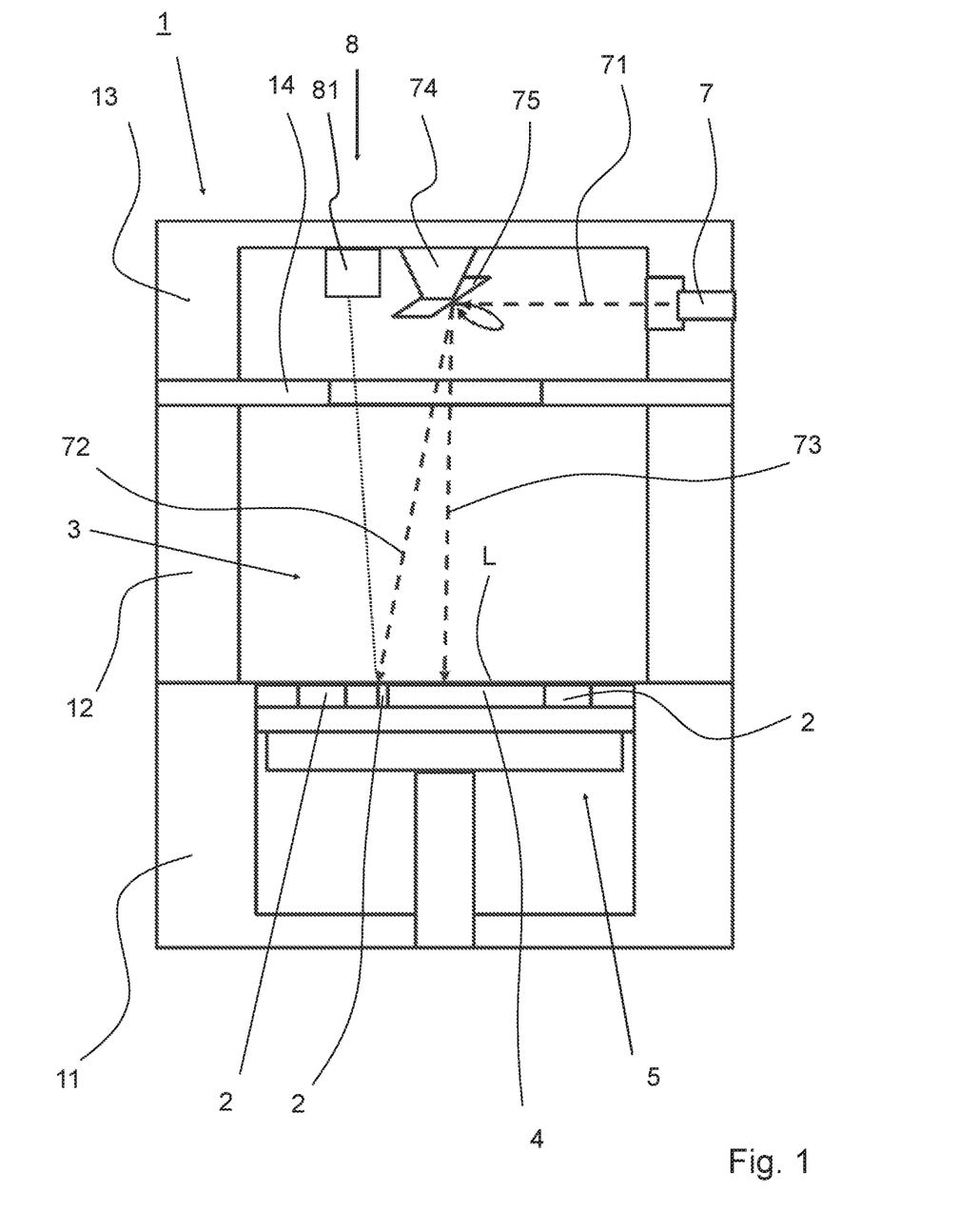
FIG. 1 is a schematic overview of an apparatus according to the invention, arranged for producing an object by means of additive manufacturing.

FIG. 1 shows an overview of an apparatus 1 for producing an object 2 by the process of additive manufacturing. The apparatus 1 is built from several frame parts 11, 12, 13. The apparatus includes a process chamber 3 for receiving a bath of material 4 which can be solidified. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material. In the embodiment shown, the solidifying device 7 is a laser device, which is arranged for producing electromagnetic radiation in the form of laser light, in order to melt a powdered material provided on the support, which then, after cooling forms a solidified part of the object to be produced. However, the invention is not limited to the type of solidifying device. As can be seen, the electromagnetic radiation 71 emitted by the laser device 7 is deflected by means of a deflector unit 74, which uses a rotatable optical element 75 to direct the emitted radiation 71 towards the surface L of the layer of material 4. Depending on the position of the deflector unit 74, in particular the position of the rotatable optical element 75, radiation may be emitted, as an example, according to rays 72, 73.

The apparatus 1 may further include a recoating device (not shown) which can be displaced along the surface L of the bath for levelling the surface L of the bath of material 4. Such a recoating device is known per se to those skilled in the art.

The apparatus 1 according to the invention includes a calibration system 8 with a sensor unit 81. Details of this calibration system and sensor unit 81 will become apparent later, when the method according to the invention is described with reference to FIG. 5.

Figure 2:
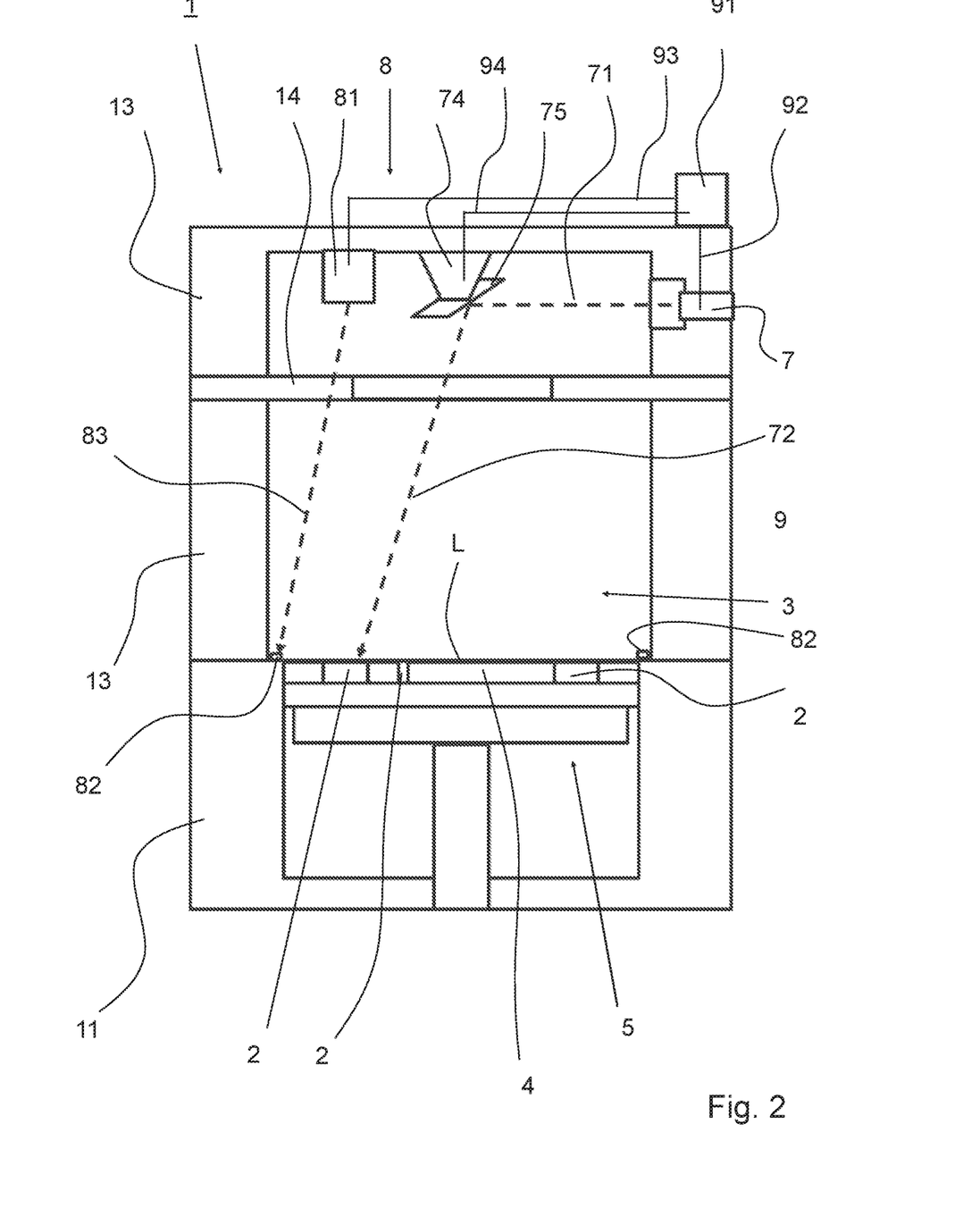
FIG. 2 is a schematic overview of an alternative embodiment of the apparatus according to the invention.

FIG. 2 shows an alternative embodiment of an apparatus 1 for producing an object 2 by a process of additive manufacturing. For sake of brevity, parts similar to those parts as described with reference to FIG. 1 have been given the same reference number and will not be discussed further. The apparatus 1 according to this embodiment includes a calibration system 8, with a sensor unit 81, here in the form of an imaging device 81, that will be used for calibration of the apparatus. The apparatus according to this embodiment further includes a control unit 91 connected, by means of line 93, to the sensor unit 81. To this end, the control unit 91 may be connected, by means of line 93, to the solidifying device, and/or to the deflector unit 74, by means of line 94.

As can be seen in FIG. 2, the sensor unit includes at least one imaging device, in particular an optical imaging device, such as a camera unit 81. The camera unit is, in this embodiment, arranged for making one or more images of calibration markers 82 provided on or near the support 5, in the example shown connected to the lower frame part 11. The one or more images of one or more of the calibration markers 82 obtained by the sensor unit are processed by the calibration system 8, for example in that they are fed to the control unit 91 for being processed there. The images of the calibration markers 82 may be used for establishing a calibration coordinate system. Thus, although beneficial, the calibration markers are not essential for the invention.

Figure 6:
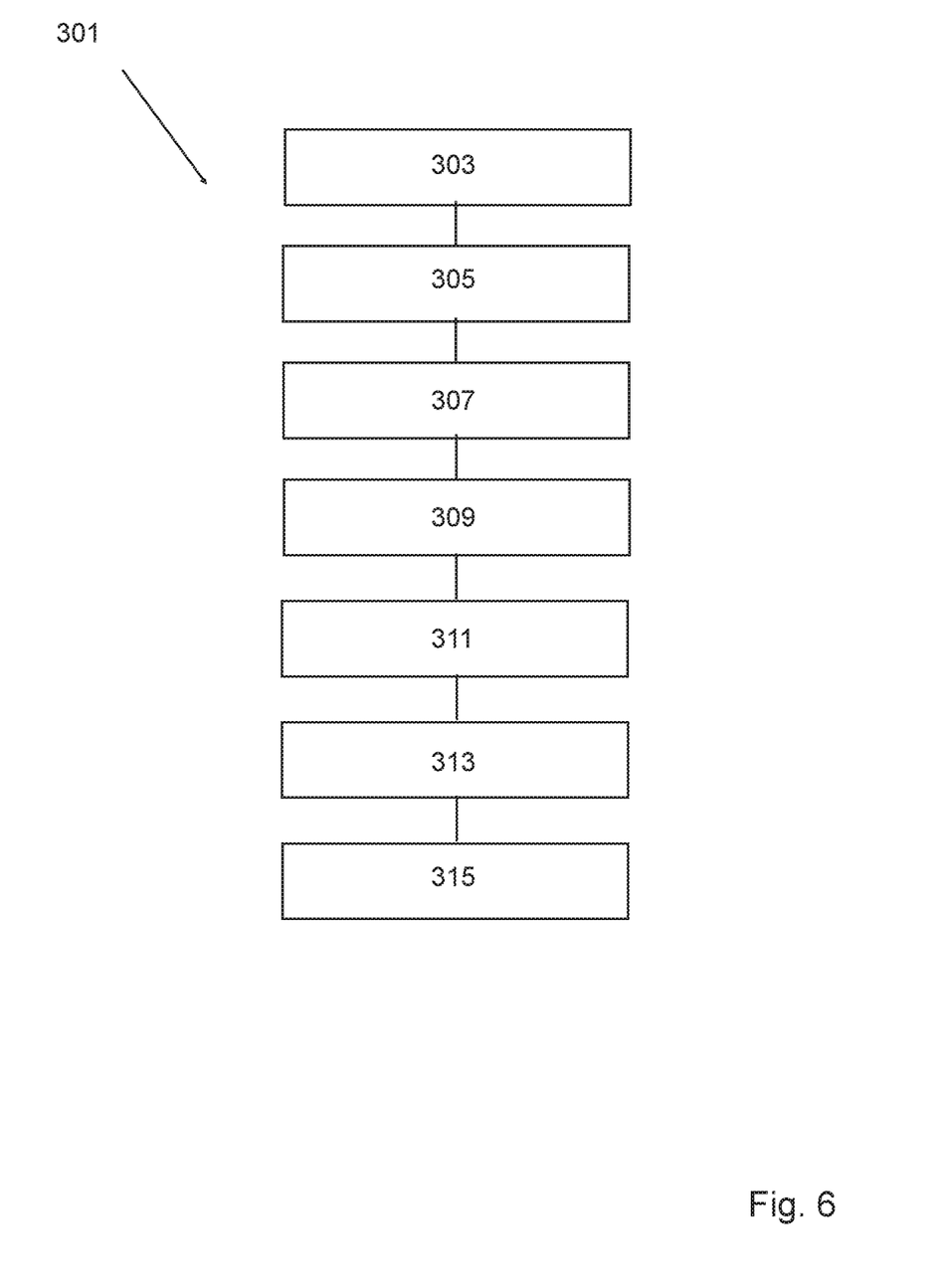
FIG. 6 is a schematic overview of a method according to the invention.
Figure 7:
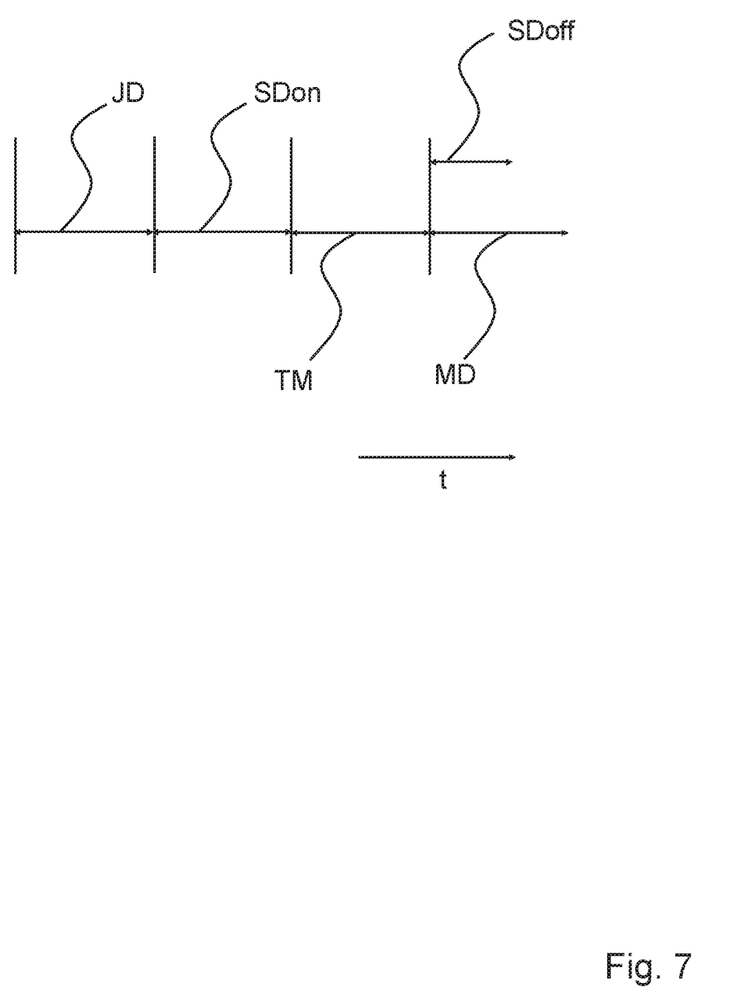
FIG. 7 is a schematic overview of delays according to the present disclosure.

The calibration system shown in FIG. 2 includes the sensor unit 81 and the control unit 91, and is arranged for performing method 301 including the steps of controlling the solidifying device 7, during a step 303, for making a first test mark TM at a first delay setting, controlling the solidifying device 7, during a step 305, for making a second test mark TM at a second delay setting different from the first delay setting, and determining a delay setting, preferably an optimal delay setting, during a step 307, based on at least the first test mark and the second test mark.

During the steps 303 and 305 of controlling, the deflector device 74 may be controlled, by the control unit 91, for deflecting the electromagnetic radiation along the surface level L for realizing the first and second test mark. Alternatively, it is conceivable that the solidifying device is moved relative to the bath of powdered material for realizing the first and second test marks.

The calibration unit 8 may determine, with the sensor unit 81, a measure for the delay setting, preferably the optimal delay setting, based on a plurality of test marks TM made by the solidifying device 7. These steps 303, 305 and 307 according to the invention will be explained in more detail with respect to FIG. 5. The delay setting may relate to the solidifying device on delay setting SDon such as a laser on delay setting or to the solidifying device off delay setting SDoff such as a laser off delay setting. The delay setting may furthermore relate to a jump delay setting JD and a mark delay setting MD.

Figure 3:
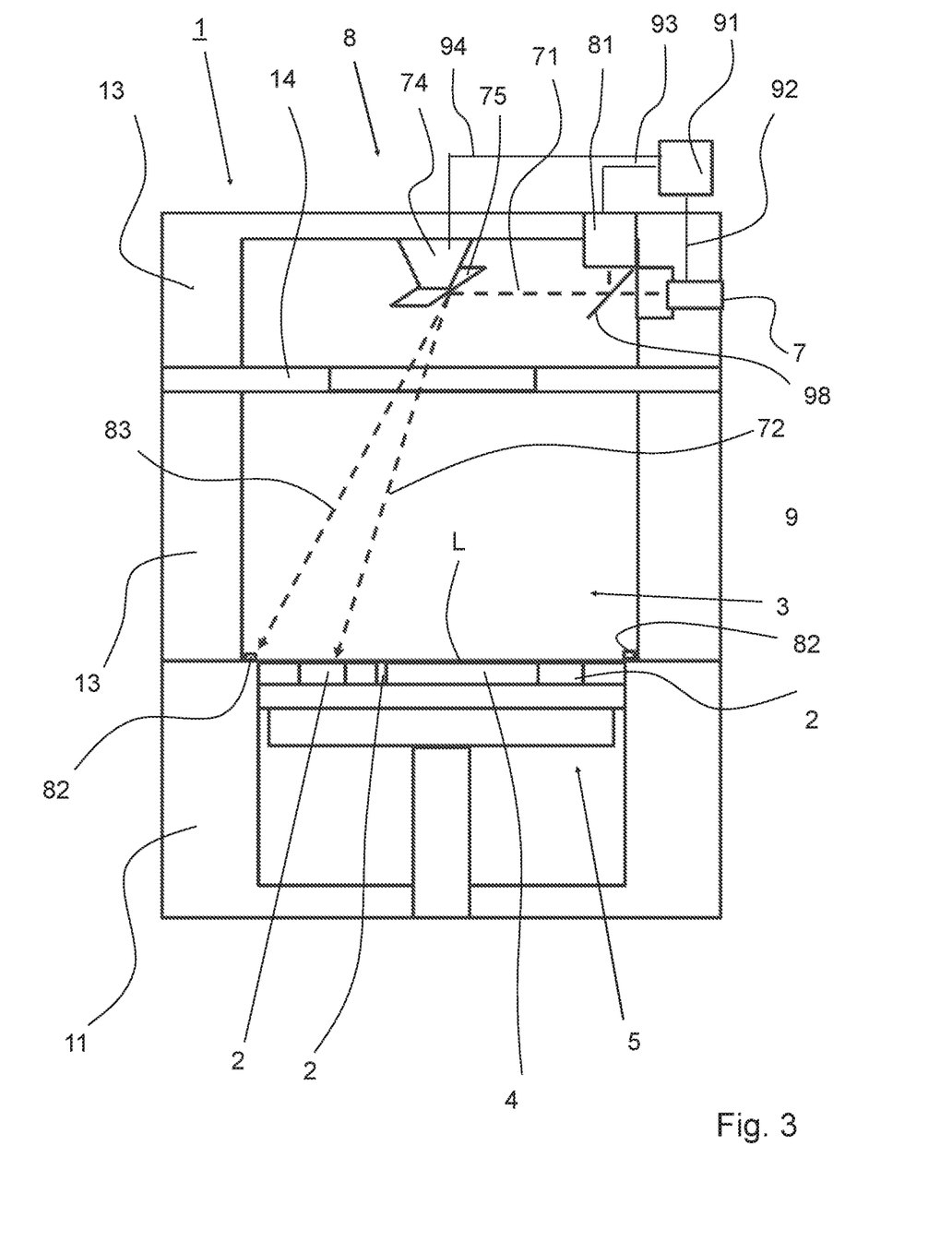
FIG. 3 is a schematic overview of a further embodiment of the apparatus according to the invention.

FIG. 3 shows a further embodiment of an apparatus 1 suitable to be used in the method according to the invention. The apparatus 1 largely corresponds to the apparatus as shown in FIG. 2, and for reasons of conciseness, mainly the differences will be described. As can be seen in FIG. 3, the main difference is that the position of the imaging device 81 differs with respect to the embodiment shown in FIG. 2. Here, the imaging device 81 is arranged such that an optical path 71 of the imaging device 81, during use of the imaging device 81, at least partly coincides with an optical path 71 of the electromagnetic radiation generated by the solidifying device 7, during use of the solidifying device 7. It should be expressly noted in this respect, that the imaging device 81 and the solidifying device 7 do not necessarily have to be operated at the same time, although this is conceivable. For instance, in an embodiment, the first mark, second mark, and/or reference mark (and/or other marks) is/are only registered when the solidifying device 7 is free from emitting electromagnetic radiation, although it is also possible that the characteristic registered is electromagnetic radiation itself. In the embodiment shown in FIG. 3, use is made of an optical device, such as a semi-transparent mirror element, or a single lens reflex arrangement, to be able to obtain an image of the calibration area, using the registering means 81, via the deflector unit 74, and to use the information obtained by the registering means 81. The method according to the invention, using such an apparatus, will be described further below with respect to FIG. 5.

Figure 4:
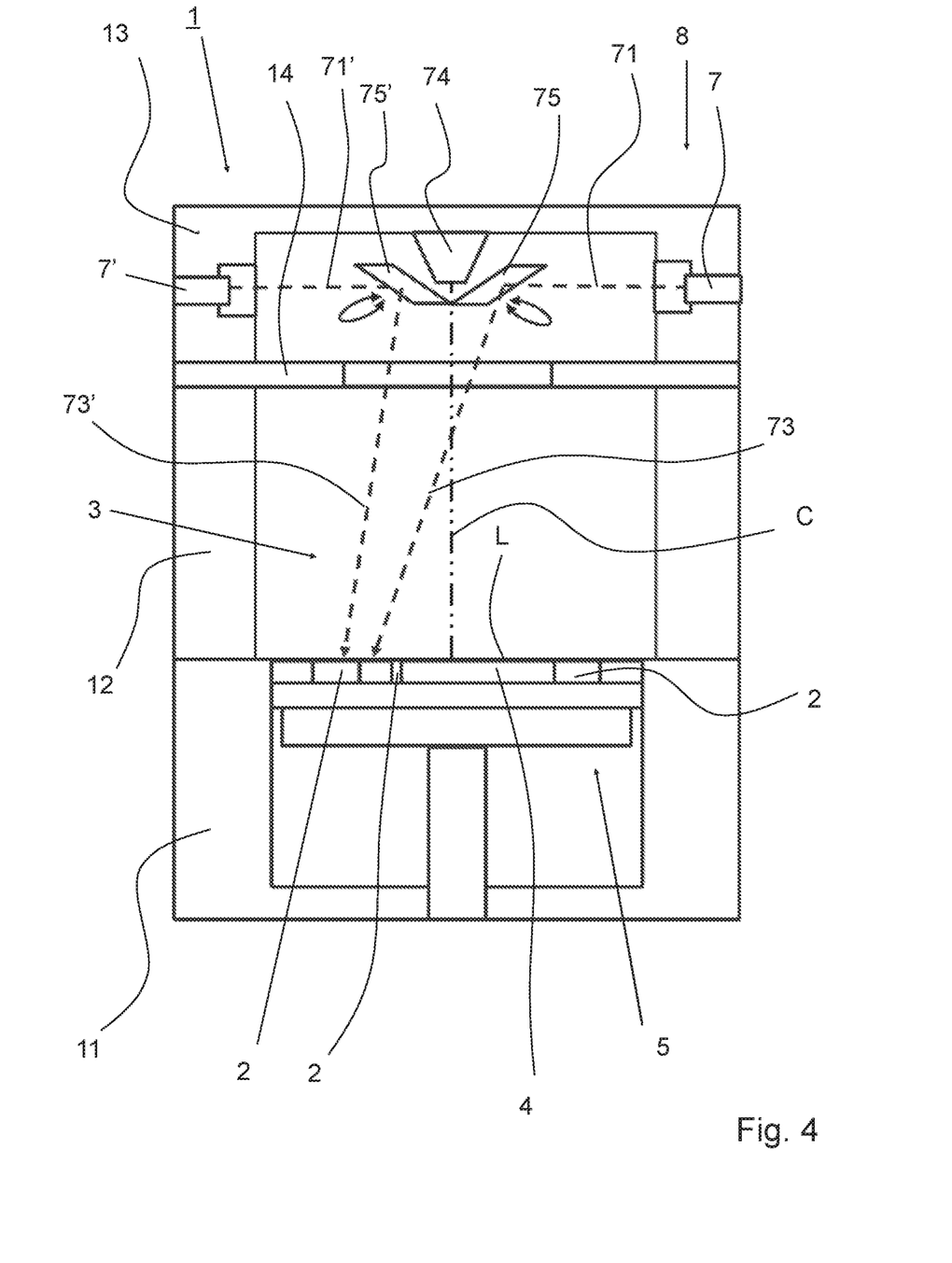
FIG. 4 is a schematic overview of yet a further embodiment of the apparatus according to the invention.

FIG. 4 shows an overview of an apparatus 1 for producing an object 2 by a process of additive manufacturing, according to yet a further embodiment of the present invention. As in the previous embodiments, a first solidifying device 7 is provided for solidifying a selective part of the material by means of electromagnetic radiation. The top part 13 of the apparatus 1 also includes a further solidifying device 7' for solidifying a selective part of the material by means of electromagnetic radiation. As can be seen, the electromagnetic radiation 71' emitted by the further laser device 7' is deflected by means of a further rotatable deflector unit 75' to direct the emitted radiation 71' thereof towards the surface L of the layer of material 4.

In the embodiment shown, the solidifying device 7 and the further solidifying device 7' are laser devices, which are arranged for producing electromagnetic radiation in the form of laser light, in order to melt a powdered material provided on the support, which then, after cooling forms a solidified part of the object to be produced. However, the invention is not limited to this type of solidifying device, but includes in general solidifying devices that use electromagnetic radiation. Furthermore, the type of electromagnetic radiation emitted by the plurality of solidifying devices may be the same for each and every solidifying device, although it is conceivable that the type of electromagnetic radiation emitted by the plurality of solidifying devices differs for at least two of the plurality of solidifying devices.

It can be seen furthermore in FIG. 4, that the plurality of deflector means 75, 75' are positioned near a line C perpendicular to the plane defined by the object working area L, and which line C passes through geometrical centre of gravity of the object working area L. In other words, the deflector means 75, 75' are substantially provided above a centre part of the object working area L. This allows each of the plurality of solidifying devices to easily reach substantially the entire object working area, such that, for instance, simultaneous solidifying of different parts of a single object may occur.

Not shown in FIG. 4, for reasons of keeping the Figures clear and legible, is that imaging devices may be provided for each solidifying device 7, 7'. Thus, like the embodiments shown in FIG. 2 and FIG. 3, an imaging device 81 may be provided for each solidifying device. In particular, one or more of the imaging devices 81 may be arranged such that an optical path 71 of the respective imaging device 81, during use of the imaging device 81, at least partly coincides with an optical path 71 of the electromagnetic radiation generated by the corresponding solidifying device 7, 7'. These one or more imaging devices are hence part of the calibration system 8 with sensor unit 81. The method according to the invention is in particular very advantageous in calibrating such an apparatus, in particular for aligning delay settings, such as the solidifying device on/off delay setting SDon/SDoff, the jump delay setting JD and the mark delay setting MD, of a plurality of solidifying devices with each other. The invention is in principle not limited to the number of solidifying devices used, or to the number of imaging devices used.

Referring back to FIG. 4, it can be seen that the apparatus 1 further includes control means 74 arranged for controlling the plurality of solidifying devices 7, 7', wherein the control means are arranged for simultaneously operating the plurality of solidifying devices 7, 7' in different parts of the object working area L.

Thus, with the apparatus shown in FIG. 4, the plurality of solidifying devices 7, 7' may be controlled to work in substantially the entire object working area L, such that it is possible to solidify different parts of a single object 2 at the same time. By simultaneously solidifying different parts of a single object, this object may be produced more quickly, and total production time of the object may be decreased. To increase the accuracy, calibration of delay settings of each of the solidifying devices, and alignment thereof, is required.

Figure 5:
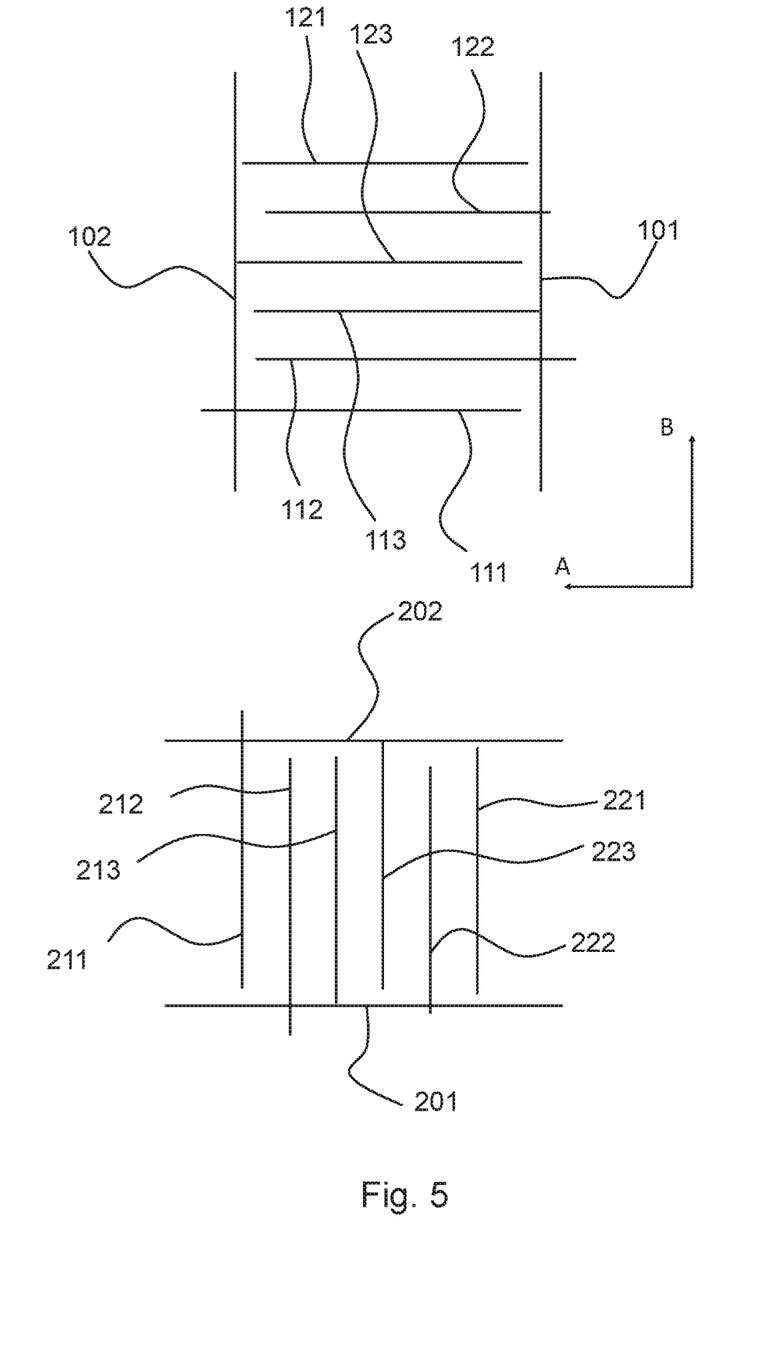
FIG. 5 illustrates an embodiment of test marks and reference marks that are used in the method according to the invention.

Using the apparatus 1, delay settings, preferably optimal delay settings, can be determined as outlined hereinafter with reference to FIG. 5 in a first direction A and a second direction B. FIG. 5 shows a first reference mark 101 and a second reference mark 102, both made on an exposure plate using the solidifying device 7. The first reference mark 101 and the second reference mark 102 are substantially parallel and positioned at a distance to each other. The first reference mark 101 is a start mark for determining a delay setting, preferably an optimal delay setting, such as the solidifying device on delay setting SDon and the jump delay setting JD, for starting the marking with the solidifying device 7 in direction A. The second reference mark 102 is a stop mark for determining a delay setting, preferably an optimal delay setting, such as the solidifying off delay setting SDoff and the mark delay setting MD for stopping the marking with the solidifying device 7 in direction A.

After providing the first and second reference marks 101, 102 several test marks 111, 112, 113, 121, 122 and 123 are made at different delay settings of one of the solidifying device on/off delay setting SDon/SDoff, the jump delay setting JD and the mark delay setting MD. The test marks 111, 112, 113, 121, 122 and 123 extent in a direction substantially perpendicular to the first and second reference marks 101, 102 and are made with the intention to start at the first reference mark 101 and end at the second reference mark 102. A measure for the positions of the first reference mark 101, second reference mark 102 and the test marks 111, 112, 113, 121, 122 and 123 are determined by obtaining an image of the first reference mark 101, second reference mark 102 and the test marks 111, 112, 113, 121, 122 and 123 by the imaging device 81 of calibration system 8 of the apparatus 1.

For determining the delay setting, preferably the optimal delay setting, for stopping the marking with the solidifying device 7 test marks 121 and 122 are made. Subsequently, the calibration system 8 determines the distance between the second reference mark 102 and the end of the test mark 121 and the distance between the second reference mark 102 and the end of the test mark 122. Based on these determined distances between the end of the test mark 121 and the reference mark 102 and between the end of the test mark 121 and the reference mark 102 a delay setting, preferably an optimal delay setting, is determined using a fit function such as a linear interpolation. Subsequently, test mark 123 is made using the determined delay setting, preferably optimal delay setting, for verification of the delay setting, preferably optimal delay setting, for stopping the marking with the solidifying device 7. A setting that results in a end of the test mark 123 at the second reference mark 102 is considered the delay setting, preferably the optimal delay setting, for stopping the marking with the solidifying device 7 in direction A. Alternatively, it is conceivable that an end of a test mark at a predetermined distance from the second reference mark is considered the delay setting, preferably the optimal delay setting, for stopping the marking with the solidifying device in direction A.

For determining the delay setting, preferably the optimal delay setting for starting the marking with the solidifying device 7 test marks 111 and 112 are made. Subsequently, the calibration system 8 determines the distance between the first reference mark 101 and the start of the test mark 111 and the distance between the first reference mark 101 and the start of the test mark 112. Based on these determined distances between the start of the test mark 111 and the first reference mark 101 and between the start of the test mark 111 and the first reference mark 101 a delay setting, preferably an optimal delay setting, is determined using a fit function such as a linear interpolation. Subsequently, test mark 113 is made using the determined delay setting, preferably the optimal delay setting, for verification of the delay setting, preferably the optimal delay setting, for starting the marking with the solidifying device 7. A setting that results in a start of test mark 113 at the first reference mark 101 is considered the delay setting, preferably the optimal delay setting, for starting the marking with the solidifying device 7 in direction A. Alternatively, it is conceivable that a start of a test mark at a predetermined distance from the first reference mark is considered the delay setting, preferably optimal delay setting, for starting the marking with the solidifying device in direction A.

Using the apparatus 1, delay settings, preferably optimal delay settings, can be determined in the second direction B in a manner similar as outlined above with reference to FIG.

5 in the first direction A. FIG. 5 shows a third reference mark 201 and a fourth reference mark 202, both made on an exposure plate using the solidifying device 7. The third reference mark 201 and the fourth reference mark 202 are substantially parallel, positioned at a distance to each other and enclose an angle different from 0 degrees with the first reference mark 101 and the second reference mark 102. The third reference mark 201 is a start mark for determining a delay setting, preferably an optimal delay setting, for starting the marking with the solidifying device 7 in direction B. The fourth reference mark 202 is a stop mark for determining a delay setting, preferably an optimal delay setting, for stopping the marking with the solidifying device 7 in direction B.

After providing the third and fourth reference marks 201, 202 several test marks 211, 212, 213, 221, 222 and 223 are made at different delay settings of one of the solidifying device on/off delay setting SDon/SDoff, the jump delay setting JD and the mark delay setting MD. The test marks 211, 212, 213, 221, 222 and 223 extent in a direction substantially perpendicular to the third and fourth reference marks 201, 202 and are made with the intention to start at the third reference mark 201 and end at the fourth reference mark 202. A measure for the positions of the third reference mark 201, fourth reference mark 202 and the test marks 211, 212, 213, 221, 222 and 223 are determined by obtaining an image of the third reference mark 201, fourth reference mark 202 and the test marks 211, 212, 213, 221, 222 and 223 by the imaging device 81 of calibration system 8 of the apparatus 1.

For determining the delay setting, preferably the optimal delay setting, for stopping the marking with the solidifying device 7 test marks 221 and 222 are made. Subsequently, the calibration system 8 determines the distance between the fourth reference mark 202 and the end of the test mark 221 and the distance between the fourth reference mark 202 and the end of the test mark 222. Based on these determined distances between the end of the test mark 221 and the reference mark 202 and between the end of the test mark 221 and the reference mark 202 a delay setting, preferably an optimal delay setting, is determined using a fit function such as a linear interpolation. Subsequently, test mark 223 is made using the determined optimal delay setting for verification of the delay setting, preferably the optimal delay setting, for stopping the marking with the solidifying device 7 in direction B. A setting that results in a end of the test mark 223 at the fourth reference mark 202 is considered the delay setting, preferably the optimal delay setting, for stopping the marking with the solidifying device 7 in direction B. Alternatively, it is conceivable that an end of a test mark at a predetermined distance from the fourth reference mark is considered the delay setting, preferably the optimal delay setting, for stopping the marking with the solidifying device in direction B.

For determining the delay setting, preferably the optimal delay setting, for starting the marking with the solidifying device 7 in direction B test marks 211 and 212 are made. Subsequently, the calibration system 8 determines the distance between the third reference mark 201 and the start of the test mark 211 and the distance between the third reference mark 201 and the start of the test mark 212. Based on these determined distances between the start of the test mark 211 and the third reference mark 201 and between the start of the test mark 211 and the third reference mark 201 a delay setting, preferably an optimal delay setting, is determined using a fit function such as a linear interpolation. Subsequently, test mark 213 is made using the determined delay setting, preferably the optimal delay setting, for verification of the delay setting, preferably the optimal delay setting, for starting the marking with the solidifying device 7 in direction B. A setting that results in a start of test mark 213 at the third reference mark 201 is considered the delay setting, preferably the optimal delay setting, for starting the solidifying device 7 in direction B. Alternatively, it is conceivable that a start of a test mark at a predetermined distance from the third reference mark is considered the delay setting, preferably the optimal delay setting, for starting the marking with the solidifying device in direction B.

After determining the delay setting, preferably the optimal delay setting, for one of the solidifying device on delay setting SDon, the solidifying device off delay setting SDoff, the jump delay setting JD or the mark delay setting MD, apparatus 1 may be used for determining another one of the solidifying device on delay setting SDon, the solidifying device off delay setting SDoff, the jump delay setting JD or the mark delay setting MD. This allows for determining delay settings related to multiple commands that may be provided by the control unit 91 to the solidifying device 7 and/or the deflector unit 74. The calibration system of apparatus 1 is further arranged for performing the steps of setting the delay setting, during a step 309, determined during the step 307 of determining, to the delay setting, further controlling the solidifying device 7 and the deflector unit 74, during a step 311, for making a further first test mark at a further first delay setting, further controlling the solidifying device 7 and the deflector unit 74, during a step 313, for making a further second test mark at a further second delay setting different from the further first delay setting, and further determining a further delay setting, preferably a further optimal delay setting, during a step 315, based on at least the further first test mark and the further second test mark.

During the steps 311 and 313 of further controlling the further first delay setting and the further second delay setting are both another one of the solidifying device on delay setting SDon, the solidifying device off delay setting SSDoff, the jump delay setting JD or the mark delay setting MD.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An apparatus for producing an object by additive manufacturing, comprising:
   a process chamber for receiving a bath of material configured to be solidified by exposure to electromagnetic radiation;
   a support for positioning the object in relation to the surface level of the bath of material;
   a solidifying device for solidifying a selective layer-part of the material on the surface level by electromagnetic radiation;
   a deflector unit for deflecting the electromagnetic radiation toward the surface level; and
   a calibration system having a controller and a sensor unit configured to be directed to the support, the sensor unit including an imaging device, wherein the calibration system is adapted and arranged for:
   controlling the solidifying device for making, via the deflector unit, a first test mark at a first delay setting;

controlling the solidifying device for making, via the deflector unit, a second test mark at a second delay setting different from the first delay setting;

obtaining with the imaging device, via the deflector unit, an image of the first and second test marks;

determining, with the sensor unit, a measure for the position of the first and second test marks; and determining an optimal delay setting based on at least the first test mark and the second test mark;

wherein the first delay setting, the second delay setting, and the optimal delay setting are each one of an on delay setting of the solidifying device, an off delay setting of the solidifying device, a jump delay setting, and a mark delay setting; and wherein an optical path of the imaging device, in use of the apparatus via the deflector unit, at least partly coincides with an optical path of the electromagnetic radiation of the solidifying device.

2. The apparatus according to claim 1, wherein the calibration system is adapted and arranged for:
controlling the solidifying device for making a reference mark; and
determining the optimal delay setting based on the reference mark.

3. The apparatus according to claim 2, wherein the calibration system is adapted and arranged for:
controlling the solidifying device for making the reference mark such that the reference mark is a line; and
controlling the solidifying device for making the first and second test marks such that the first and second test marks are lines having an orthogonal component with respect to the reference mark.

4. The apparatus according to claim 3, wherein the calibration system is adapted and arranged for:
controlling a beam of the electromagnetic radiation, emitted by the solidifying device, such that the beam is moved at a first speed; and
repeating the steps of controlling and determining, wherein during the repeated steps of controlling the solidifying device, the beam of the electromagnetic radiation, emitted by the solidifying device, is moved at a second speed different from the first speed, wherein during the step of determining, the optimal delay setting is determined for the first and second speeds.

5. The apparatus according to claim 2, wherein the calibration system is adapted and arranged for:
controlling the solidifying device for making the reference mark such that the reference mark is a line; and
controlling the solidifying device for making the first and second test marks such that the first and second test marks are lines substantially orthogonal with respect to the reference mark.

6. The apparatus according to claim 2, wherein the calibration system is adapted and arranged for:
determining a distance between the reference mark and the respective first and second test marks.

7. The apparatus according to claim 6, wherein the calibration system is adapted and arranged for:
determining a distance between the reference mark and the respective first and second test marks, wherein the distance comprises a first distance component and a second distance component, wherein the second distance component, in a working plane, encloses an angle with the first distance component, and wherein a delay setting in a first direction is based on the first distance component and a delay setting in a second direction, different from the first direction, is based on the second distance component.

8. The apparatus according to claim 1, wherein the imaging device is adapted and arranged for obtaining an image of the reference mark.

9. The apparatus according to claim 1, wherein the calibration system is adapted and arranged for:
controlling a beam of the electromagnetic radiation, emitted by the solidifying device, such that the beam is moved in a first direction; and
repeating the steps of controlling and determining, wherein during the repeated steps of controlling the solidifying device, the beam of the electromagnetic radiation, emitted by the solidifying device, is moved in a second direction, wherein the second direction differs from the first direction for determining the delay setting in the first direction and in the second direction.

10. The apparatus according to claim 1, wherein the on delay setting is arranged for delaying an on command to the solidifying device for delaying start of emission of electromagnetic radiation, emitted by the solidifying device;
the off delay setting is arranged for delaying an off command to the solidifying device for delaying stop of emission of electromagnetic radiation, emitted by the solidifying device;
the jump delay setting is arranged for delaying the on command to the solidifying device for delaying start of emission of electromagnetic radiation, emitted by the solidifying device, wherein the jump delay setting indicates a time for actuating the deflector unit for deflecting the electromagnetic radiation along the surface level to a predetermined position; or
the mark delay setting is arranged for delaying a stop of movement command to the deflector unit for deflecting the electromagnetic radiation, emitted by the solidifying device, along the surface level.

11. The apparatus according to claim 10, wherein the calibration system is adapted and arranged for:
further controlling the solidifying device for making an additional first test mark at an additional first delay setting;
further controlling the solidifying device for making an additional second test mark at an additional second delay setting different from the additional first delay setting; and
further determining an additional delay setting based on at least the additional first test mark and the additional second test mark;
wherein during the steps of further controlling, the additional first delay setting and the additional second delay setting are both another one of the on delay setting, the off delay setting, the jump delay setting, and the mark delay setting.

12. The apparatus according to claim 11, wherein the calibration system is adapted and arranged for:
setting the delay setting, determined during the step of determining, to the optimal delay setting,
wherein the step of setting is performed before performing the steps of further controlling.

13. The apparatus according to claim 1, wherein the apparatus comprises an additional solidifying device, and wherein the calibration system is adapted and arranged for:
controlling the additional solidifying device for making, via the deflector unit, a third test mark at a third delay setting;

controlling the additional solidifying device for making, via the deflector unit, a fourth test mark at a fourth delay setting different from the third delay setting; and determining a further optimal delay setting based on at least the third test mark and the fourth test mark.

14. The apparatus according to claim 13, wherein the sensor unit comprises at least an additional imaging device that is aligned with the additional solidifying device such that an optical path of the additional imaging device, in use of the apparatus via the deflector unit, coincides at least partly with an optical path of the electromagnetic radiation of the additional solidifying device, wherein the additional imaging device is used for obtaining an image of the third and fourth test marks.

15. The apparatus according to claim 13, wherein the calibration system is adapted and arranged for:

controlling the solidifying device for making, via the deflector unit, a fifth test mark at the determined optimal delay setting of the solidifying device;

controlling the additional solidifying device for making, via the deflector unit, a sixth test mark at the determined further optimal delay setting of the additional solidifying device; and determining a difference in spatial accuracy between the solidifying device and the additional solidifying device based on at least the fifth test mark and the sixth test mark.

\* \* \* \* \*